United States Patent
Gutti et al.

(10) Patent No.: US 9,424,296 B2
(45) Date of Patent: Aug. 23, 2016

(54) INDEXING OF DATABASE QUERIES

(71) Applicant: Infoblox Inc., Santa Clara, CA (US)

(72) Inventors: Srinath Gutti, Sunnyvale, CA (US);
Stuart M. Bailey, San Jose, CA (US);
Ivan W. Pulleyn, Sunnyvale, CA (US)

(73) Assignee: Infoblox Inc., Santa Clara, CA (US)

( * ) Notice: Subject to any disclaimer, the term of this patent is extended or adjusted under 35 U.S.C. 154(b) by 526 days.

(21) Appl. No.: 13/929,424

(22) Filed: Jun. 27, 2013

(65) Prior Publication Data

US 2014/0012827 A1    Jan. 9, 2014

Related U.S. Application Data

(63) Continuation of application No. 13/035,858, filed on Feb. 25, 2011, now Pat. No. 8,498,973, which is a continuation of application No. 11/200,849, filed on Aug. 10, 2005, now Pat. No. 7,917,482.

(51) Int. Cl.
*G06F 17/30* (2006.01)
*G06F 7/00* (2006.01)
*G06F 17/00* (2006.01)

(52) U.S. Cl.
CPC ............ *G06F 17/30336* (2013.01); *G06F 7/00* (2013.01); *G06F 17/30457* (2013.01); *G06F 17/30501* (2013.01); *G06F 17/00* (2013.01)

(58) Field of Classification Search
None
See application file for complete search history.

(56) References Cited

U.S. PATENT DOCUMENTS

| | | | | |
|---|---|---|---|---|
| 6,993,530 B2 * | 1/2006 | Lee | ................... | G06F 17/30557 707/769 |
| 2002/0129001 A1 * | 9/2002 | Levkoff | .............. | G06F 17/5004 |
| 2002/0161745 A1 * | 10/2002 | Call | .......................... | A61L 2/10 |
| 2005/0055355 A1 * | 3/2005 | Murthy | ............. | G06F 17/30914 |

* cited by examiner

Primary Examiner — Jay Morrison
(74) Attorney, Agent, or Firm — Van Pelt, Yi & James LLP

(57) ABSTRACT

Making data available from a database is disclosed. Making data available includes specifying a query function having a query function name, wherein the query function includes a structure and a member, determining the structure and the member included in the query function, wherein the query function has a query function name and includes the structure and the member, creating an index for the structure on the member, and compiling the query function to be available to a user by invoking the query function name without the user having to specify the structure and the member. Retrieving data from a database is disclosed. Retrieving includes invoking a query function that specifies a plurality of structures and a value, accessing a cross index of the plurality of structures, and using the cross index to access the data.

20 Claims, 4 Drawing Sheets t1

| Key | X | Y | Z |
|---|---|---|---|
| 1 | a | r | b |
| 2 | b | q | b |
| 3 | c | r | a |
| 4 | d | r | c |
| 5 | c | q | a |
| 6 | d | q | b |

— 202 t2

| Key | J | K | L |
|---|---|---|---|
| x.c.a | x | c.a | 1 |
| x.c.b | x | c.b | 2 |
| y.c.c | y | c.c | 3 |
| z.c.a | z | c.a | 4 |

— 204

INDEXING OF DATABASE QUERIES

CROSS REFERENCE TO OTHER APPLICATIONS

This application is a continuation of co-pending U.S. patent application Ser. No. 13/035,858, entitled INDEXING OF DATABASE QUERIES filed Feb. 25, 2011, which is a continuation of U.S. patent application Ser. No. 11/200,849, now U.S. Pat. No. 7,917,482, entitled INDEXING OF DATABASE QUERIES filed Aug. 10, 2005 all of which are incorporated herein by reference for all purposes.

BACKGROUND OF THE INVENTION

Database queries can be indexed to increase the speed of lookups. For example, a frequently made query may be indexed by maintaining a separate list of all objects that satisfy that query. Whenever that query is made, the result can be obtained by accessing the index rather than searching the database. Typically, the indexes that are maintained are manually specified prior to runtime, which can be time consuming. In addition, some queries may require accessing multiple indexes, which can take additional processing time. It would be desirable to have a more efficient method of accessing data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of making data available from a database is disclosed. A structure and a member included in a query function are determined, an index is created for the structure on the member, and the query function is compiled. A method of retrieving data from a database is also disclosed. A query function that specifies a value is invoked. A cross index is accessed, where the cross index indexes a virtual structure on a virtual member that corresponds to the value. The cross index is used to access the data.

Figure 1:
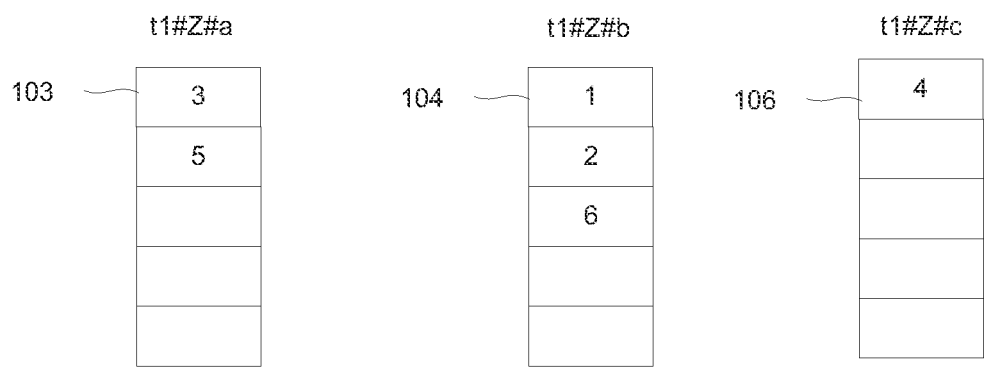
FIG. 1 is a diagram illustrating an example of a table and an index for that table.

FIG. 1 is a diagram illustrating an example of a table and an index for that table. Table 102 has four columns (Key, X, Y, and Z) and six rows. Each row is associated with a key, where the key is a unique identifier of that row. For example, as shown here, the key can be a number that increments by one for each row. An index can be maintained on any one of columns X, Y, or Z. For example, index lists 103-106 form an index on column Z. List 103 (t1#Z#a) is a list of all rows in table 102 where Z=a. In this example, the list comprises a list of keys. For example, list 103 lists keys 3 and 5, which correspond to the rows in table 102 where Z=a. Similarly, list 104 (t1#Z#b) is a list of all rows in table t1 where Z=b. List 106 (t1#Z#c) is a list of all rows in table t1 where Z=c. As used herein, the notation <structure>#<member>#<value> is used to represent the objects (rows) in <structure> where <member>=<value>. For example, t1#Z#a represents list 103, t1#Z#b represents list 104, and t1#Z#c represents list 106. In some embodiments, the lists are accessed using a hash table, where the hash key is also of the form <structure>#<member>#<value>. For purposes of explanation, a table having columns and rows are used in this and some of the following examples. However, any structure having members and objects of that structure type may be used in these examples.

In some embodiments, a query function specifies a query in a markup language, such as Extensible Markup Language (XML). When the markup language is compiled, the query can be made by calling the query function. Indexes can be derived from these query functions and automatically generated when the markup language is compiled.

The following is an example of a query function expressed in an XML (Example 1):

```
<function name = "select_t1">
    <argument name = "x">
    <argument name = "z">
    <return name = query = "select * from t1 where (X = '${x}') and (Z = '${z}')">
</function>
```

In this example, a function with two arguments (x and z) is specified. The function returns objects in structure t1 where X=x and Z=z. When this code is compiled, an index on X and an index on Z are automatically generated. For example, if the possible values of X are a, b, c, and d, then the index on X would include: t1#X#a, t1#X#b, t1#X#c, and t1#X#d. If the possible values of Z are a, b, and c, the index on Z would include: t1#Z#a, t1#Z#b, and t1#Z#c. In one embodiment, the possible values of X and Z are specified in XML. Once the indexes are generated, queries for objects in structure t1 where X=x and Z=z are satisfied by accessing the corresponding indexes. For example, if the query "select * from t1 where X=c and Z=a" is submitted, lists t1#X#c and t1#Z#a would be accessed. The intersection of those lists would then be computed and returned.

In some embodiments, to avoid having to compute the intersection, an index could be maintained on the intersection of X and Z. For example, if X can have one of four values and Z can have one of three values, a total of 12 (=4*3) lists would be generated, i.e., the index would comprise the following lists: t1#X&Z#a.a, t1#X&Z#a.b, t1#X&Z#a.c, t1#X&Z#b.a, t1#X&Z#b.b, t1#X&Z#b.c, t1#X&Z#c.a, t1#X&Z#c.b, t1#X&Z#c.c, t1#X&Z#d.a, t1#X&Z#d.b, and t1#X&Z#d.c. Thus, if the query "select * from t1 where X=c and Z=a" is submitted, list t1#X&Z#c.z would be accessed.

In some embodiments, indexes that might be desired in the future can be specified in the markup language. For example, if there is a possibility that an index on column Y would be needed, this can be specified in the markup language. If that index needs to be generated in the future, it could be done without recompiling the XML.

Figure 2:
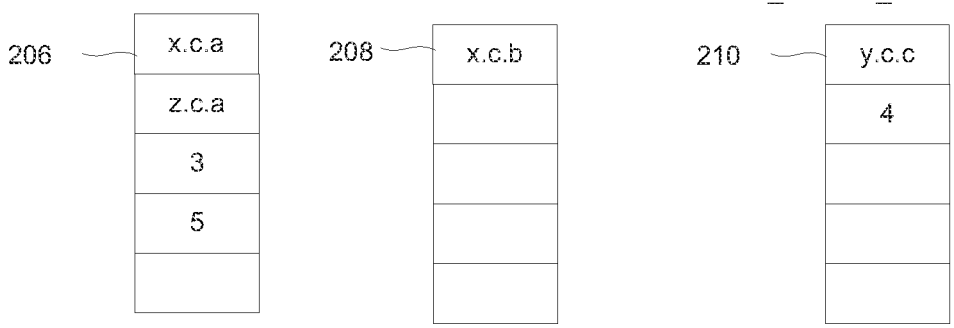
FIG. 2 is a diagram illustrating an example of two structures and cross index lists associated with those structures.

FIG. 2 is a diagram illustrating an example of two structures and cross index lists associated with those structures. In this example, the structures are table 202 (t1) and table 204 (t2). Table 202 has six objects (rows) each having four members (columns): Key, X, Y, and Z. Table 204 has four objects each having four members: Key, J, K, and L. In table 204, the Key is a concatenation of member J and member K, where in this example, values are concatenated with the "." character.

A cross index can be formed on a combination of members from more than one table. A cross index can be viewed as a virtual table (structure) of objects from one or more tables. For example, a cross index on K in table t2 and X concatenated with Z in table t1 would include index lists 206-210. List 206 (v_struct#v_member#c.a) is a list of objects in table t2 where K=c.a and objects in table t1 where X.Z=c.a (i.e., the value of X concatenated with the value of Z has the value "c.a"). v_struct is the virtual member comprising K from table t2 and X.Z from table t1. X and Z may be concatenated in any way or combined in any other way to form a virtual member of the cross index. In some embodiments, as shown here, the list comprises a list of object keys. For example, list 206 includes objects with keys x.c.a, z.c.a, 3, and 5.

Similarly, list 208 (v_struct#v_member#c.b) is a list of all objects in table t2 where K=c.b and all objects in table t1 where X.Z=c.b. List 210 (v_struct#v_member#d.c) is a list of all objects in table t2 where K=d.c and all objects in table t1 where X.Z=d.c. Other lists included in this cross index, e.g., v_struct#v_member#c.c, v_struct#v_member#a.b, v_struct#v_member#b.b, and v_struct#v_member#d.a, are not shown. In some embodiments, the index is accessed using a hash table, where the hash key is of the form <cross_index_structure>#<cross_index arg>#<value>. For example, list 206 has hash value "v_struct#v_member#c.a".

Cross indexes can be expressed in a markup language, such as XML. The cross indexes are derived and generated from the markup language cross index specification when the XML is compiled.

The following is an example of a cross index expressed in an XML (Example 2):

```
<cross_index name = "v_struct" arg = "v_member">
    <cross_structure name = "t1">
        <member name = "X">
        <member name = "Z">
    </cross_structure>
    <cross_structure name = "t2">
        <member name = "K">
    </cross_structure>
</cross_index>
```

In this example, the query function for this cross index (v_struct) has one argument (v_member). The function returns the objects in structure t1 where X.Z=v_member and the objects in structure t2 where K=v_member.

If the possible values of v_member are c.a, c.b, c.c, a.b, b.b, d.c, and d.a, then the lists comprising the cross index would include: v_struct#v_member#c.a, v_struct#v_member#c.b, v_struct#v_member#c.c, v_struct#v_member#a.b, v_struct#v_member#b.b, v_struct#v_member#d.c, and v_struct#v_member#d.a.

The following is another example of a cross index (Example 3):

```
<cross_index name = "bind_fqdn" arg = "fqdn">
    <cross_structure name = "NS">
        <member name = "ns_name">
        <member name = "ns_zone">
    </cross_structure>
    <cross_structure name = "A">
        <member name = "X">
    </cross_structure>
</cross_index>
```

The structures included in this cross structure are an NS structure and an A structure, which are part of a DNS server. The members of the NS structure included in this cross index are ns_name and ns_zone. The member of the A structure included in this cross index is X. For example, if "www", "mail", and "ftp" are the possible values of ns_name, "infoblox.com" and "example1.com" are the possible values of ns_zone, and "www.infoblox.com", "mail.infoblox.com", "ftp.infoblox.com", and "www.example1.com" are the possible values of X, the index for this structure would include the following index lists: bind_fqdn#fqdn#www.infoblox.com, bind_fqdn#fqdn#mail.infoblox.com, bind_fqdn#fqdn#ftp.infoblox.com, and bind_fqdn#fqdn#www.example1.com.

This index may be used when a query for records (objects) with a particular fully qualified domain name (FQDN), such as "www.infoblox.com" that does not specify a record type is received. In this case, all NS and A record types associated with that FQDN are returned. The bind_fqdn cross index with fqdn="www.infoblox.com" (bind_fqdn#fqdn#www.infoblox.com) accesses both the A records in which name is "www.infoblox.com", and the NS records in which ns_name is "www" and ns_zone is "infoblox.com".

This cross index forms a virtual structure of NS records and A records with virtual member v_member. If viewed as a virtual table, the virtual structure does not necessarily have the same number of columns in each row, as would be the case when the A structure has a different number of members from the NS structure. Any number of structures and members can be included in a cross index. For example, within a DNS server, other types of records (e.g., CNAME, MX, TXT) that include FQDN information may be useful to include in the cross index of Example 3. By including all record types that include FQDN information in the cross index structure, one index could access all structures in the DNS server database related to "www.infoblox.com".

In some embodiments, a markup language such as XML is used to specify a structure, a member, a query function, and/or a cross index. In some embodiments, the query functions and cross indexes that are specified have been determined to be frequently made queries based on usage profiles or historical data.

In some embodiments, once indexes and cross indexes are created, they are updated whenever there is a write operation (e.g., add, insert, delete) performed on the database that affects that index. For example, each time a record is inserted in the database, it is determined whether an index includes that type of record and if so, that record is inserted into the index.

Example 1 can also be specified in a cross index that includes one structure and two members, as follows (Example 4):

```
<cross_index name = "select_t1" arg = "t1_arg">
    <cross_structure name = "t1">
        <member name = "X">
        <member name = "Z">
    </cross_structure>
</cross_index>
```

In this case, since X can have one of four values and Z can have one of three values, a total of 12 (=4*3) lists are maintained, i.e., the lists select_t1#t1_arg#a.a, select_t1#t1_arg#a.b, select_t1#t1_arg#a.c, select_t1#t1_arg#b.a, select_t1#t1_arg#b.b, select_t1#t1_arg#b.c, select_t1#t1_arg#c.a, select_t1#t1_arg#c.b, select_t1#t1_arg#c.c, select_t1#t1_arg#d.a, select_t1#t1_arg#d.b, and select_t1#t1_arg#d.c would comprise the index. Thus objects in t1 with any combination of values of X and Z can be quickly accessed.

Figure 3:
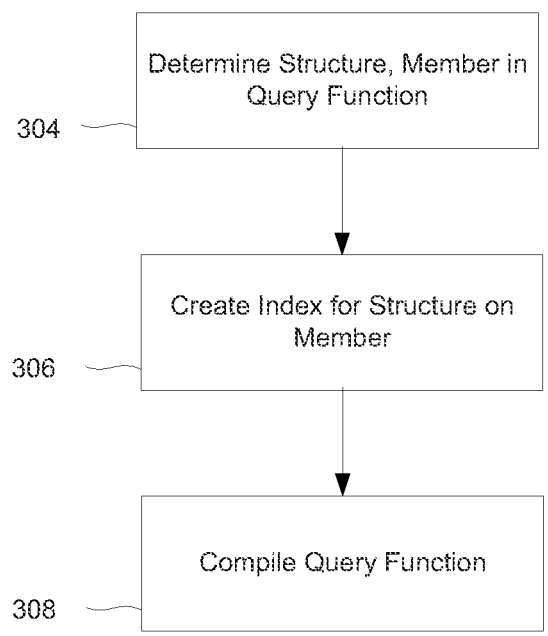
FIG. 3 is a flowchart illustrating a method of generating an index from a query function.

FIG. 3 is a flowchart illustrating a method of generating an index from a query function. A structure and member in a query function are determined (304). For example, the structure or member may be specified in a function or cross index expressed in XML, as described above. An index on the member is created (306). For example, a plurality of lists, each corresponding to a possible value of the member, may be generated, as described above. In the case of a cross index, the index may be on a virtual member. The query function is compiled (308). For example, if a function or cross index is specified in XML, the XML is compiled so that it is available by calling the query function name without specifying the structures in the query function.

Figure 4:
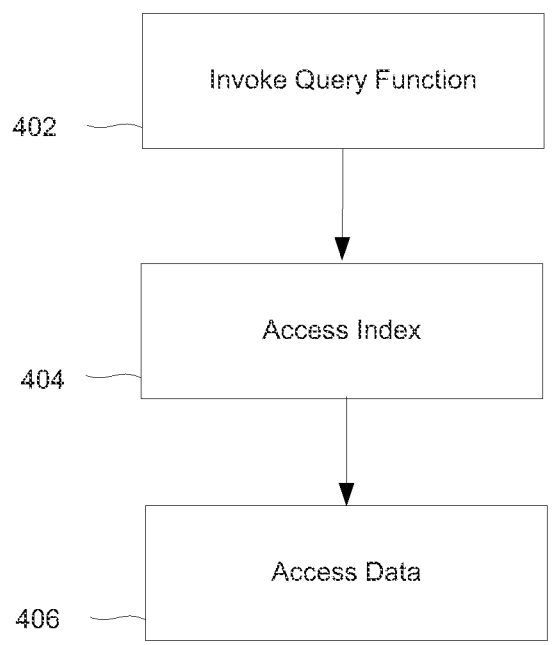
FIG. 4 is a flowchart illustrating a method of retrieving data using an index.

FIG. 4 is a flowchart illustrating a method of retrieving data using an index. A query function is invoked (402). For example, "bind_fqdn(www.infoblox.com)" or "select * from t1 where X=c and Z=b" is called. In this example, "bind_fqdn (www.infoblox.com)" is the syntax for a query that returns all objects associated with FQDN "www.infoblox.com". An index is accessed (406). For example, in the case of "bind_fqdn(www.infoblox.com)", the cross index bind_fqdn is accessed. In the case of "select * from t1 where X=c and Z=b", the index t1#X&Z is accessed. The data is accessed (408). For example, in the case of "bind_fqdn(www.infoblox.com)", the list bind_fqdn#fqdn#www.infoblox.com is accessed. In the case of "select * from t1 where X=c and Z=b", the list t1#X&Z#c.b is accessed, or the lists t1#Z#c and t1#Z#b are accessed and the intersection determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of retrieving data from a DNS database, including:
    invoking a query function for querying the DNS database using a processor, wherein the query function specifies a plurality of structures and a value; and wherein the DNS database includes a first structure and a second structure;
    accessing a cross index of the plurality of structures, wherein a first member of the first structure is concatenated with a second member of the second structure to form a third member of the cross index; and wherein the cross index indexes a structure on a member that corresponds to the value;
    using the cross index to access the data; and
    automatically updating the cross index each time a write operation is performed that affects the cross index.

2. A method as recited in claim 1, wherein the query function is specified in a cross index structure.

3. A method as recited in claim 1, wherein the member includes a key of a structure, wherein the key uniquely identifies an object.

4. A method as recited in claim 1, wherein the cross index includes a list of objects.

5. A method as recited in claim 1, wherein the cross index includes a plurality of lists corresponding to each of the possible values of the member.

6. A method as recited in claim 1, wherein the cross index includes a list of keys wherein each key uniquely identifies an object.

7. A method as recited in claim 1, wherein the query function is specified in a markup language.

8. A method as recited in claim 1, wherein the structure and the member are specified in a markup language.

9. A system for making data available from a DNS database, including:
    a processor configured to:
    invoke a query function for querying the DNS database, wherein the query function specifies a plurality of structures and a value; and wherein the DNS database includes a first structure and a second structure;
    access a cross index of the plurality of structures, wherein a first member of the first structure is concatenated with a second member of the second structure to form a third member of the cross index; and wherein the cross index indexes a structure on a member that corresponds to the value;
    use the cross index to access the data; and
    automatically update the cross index each time a write operation is performed that affects the cross index; and
    a memory coupled with the processor, wherein the memory provides the processor with instructions.

10. A system as recited in claim 9, wherein the cross index includes a list of objects.

11. A system as recited in claim 9, wherein the cross index includes a plurality of lists corresponding to each of the possible values of the virtual member.

12. A system as recited in claim 9, wherein the cross index includes a list of keys wherein each key uniquely identifies an object.

13. A system as recited in claim 9, wherein the query function is specified in a markup language, and wherein the structure and the member are specified in a markup language.

14. A computer program product for retrieving data from a DNS database, the computer program product being embodied in a tangible non-transitory computer readable medium and comprising computer instructions for:
    invoking a query function for querying the DNS database, wherein the query function specifies a plurality of structures and a value; and wherein the DNS database includes a first structure and a second structure;
    accessing a cross index of the plurality of structures, wherein a first member of the first structure is concatenated with a second member of the second structure to form a third member of the cross index; and wherein the cross index indexes a structure on a member that corresponds to the value;
    using the cross index to access the data; and
    automatically updating the cross index each time a write operation is performed that affects the cross index.

15. A computer program product as recited in claim 14, wherein the query function is specified in a cross index structure.

16. A computer program product as recited in claim 14, wherein the member includes a key of a structure, wherein the key uniquely identifies an object.

17. A computer program product as recited in claim 14, wherein the cross index includes a list of objects.

18. A computer program product as recited in claim 14, wherein the cross index includes a plurality of lists corresponding to each of the possible values of the member.

19. A computer program product as recited in claim 14, wherein the cross index includes a list of keys wherein each key uniquely identifies an object.

20. A computer program product as recited in claim 14, wherein the query function is specified in a markup language, and wherein the structure and the member are specified in a markup language.

\* \* \* \* \*